United States Patent
Tong et al.

(10) Patent No.: US 11,354,255 B2
(45) Date of Patent: Jun. 7, 2022

(54) PROCESSING CHIP HAVING DIFFERENT MODES AND CORRESPONDING CHIP SYSTEM AND OPERATION METHOD OF THE SAME

(71) Applicant: Realtek Semiconductor Corporation, Hsinchu (TW)

(72) Inventors: Li Tong, Suzhou (CN); Zuo-Hui Peng, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 132 days.

(21) Appl. No.: 16/885,711

(22) Filed: May 28, 2020

(65) Prior Publication Data

US 2020/0387461 A1  Dec. 10, 2020

(30) Foreign Application Priority Data

Jun. 4, 2019 (CN) .......................... 201910481318.9

(51) Int. Cl.
*G06F 13/16* (2006.01)
*G06F 13/12* (2006.01)
*G06F 1/3234* (2019.01)

(52) U.S. Cl.
CPC ........ *G06F 13/1668* (2013.01); *G06F 1/3275* (2013.01); *G06F 13/12* (2013.01)

(58) Field of Classification Search
CPC .............................. G06F 13/1668; G06F 13/12
See application file for complete search history.

(56) References Cited

U.S. PATENT DOCUMENTS

| 4,680,537 A * | 7/1987 | Miller ................... G01R 31/50 324/500 |
| 2005/0160333 A1 | 7/2005 | Park |
| 2005/0283671 A1 * | 12/2005 | Stave ..................... G11C 29/48 714/31 |
| 2005/0289428 A1 * | 12/2005 | Ong ................. G01R 31/31905 714/742 |
| 2007/0013402 A1 * | 1/2007 | Ong ................. G01R 31/31722 324/762.01 |
| 2016/0294378 A1 | 10/2016 | Zhang et al. |

FOREIGN PATENT DOCUMENTS

| CN | 101004686 A | 7/2007 |
| CN | 108197047 A | 6/2018 |
| EP | 1818818 A2 | 8/2007 |

\* cited by examiner

*Primary Examiner* — David E Martinez
(74) *Attorney, Agent, or Firm* — Locke Lord LLP; Tim Tingkang Xia, Esq.

(57) ABSTRACT

A chip system including I/O pins, a memory chip and a processing chip is provided. The processing chip includes I/O pads, memory access pads, a processor, an I/O controller, a memory controller and a transmission gate module. Under an operation mode, the I/O controller allows the processor to communicate with an external circuit device through the I/O controller, the I/O pads and the I/O pins. Under the operation mode, the memory controller allows the processor to access the memory chip through the memory controller and the memory access pads. The transmission gate module is enabled during a program mode or a test mode to allow the external circuit device to perform programming or testing on the memory chip through the I/O pins, the I/O pads, the transmission gate module and the memory access pads.

20 Claims, 3 Drawing Sheets

PROCESSING CHIP HAVING DIFFERENT MODES AND CORRESPONDING CHIP SYSTEM AND OPERATION METHOD OF THE SAME

RELATED APPLICATIONS

This application claims priority to China Application Serial Number 201910481318.9, filed Jun. 4, 2019, which is herein incorporated by reference.

BACKGROUND

Field of Disclosure

The present disclosure relates to chip technology. More particularly, the present disclosure relates to a processing chip, a chip system and a chip system operation method.

Description of Related Art

In a chip system, memories are disposed besides the functional chip to provide storage of data. However, modification of the data content in some memories is performed by programming. The programming process needs to be performed by programming device having a specific transmission format. Under such a condition, additional pins are required to be disposed in the package of the chip system to perform programming. If a test process is required to be performed on the memories, specific pins are also required to be disposed to perform testing. Under such a condition, the disposition of these pins increases the area cost and disposition cost of the chip system.

Accordingly, what is needed is a processing chip, a chip system and a chip system operation method to address the above issues.

SUMMARY

An aspect of the present disclosure is to provide a chip system that includes at least one I/O pin, a memory chip and a processing chip. The processing chip includes at least one I/O pad, at least one memory access pad, a processor, an I/O controller, a memory controller and a transmission gate module. The I/O pad is electrically coupled to the I/O pin. The memory access pad is electrically coupled to the memory chip. The I/O controller is configured to allow the processor to communicate with an external circuit device by using the I/O controller through the at least one I/O pad and the at least one I/O pin under an operation mode. The memory controller is configured to allow the processor to access the memory chip by using the memory controller through the at least one memory access pad under the operation mode. The transmission gate module is electrically coupled between the at least one I/O pad and the at least one memory access pad and configured to be enabled under a program mode or a test mode to allow the external circuit device to perform programming or testing on the memory chip through the at least one I/O pin, the at least one I/O pad, the transmission gate module and the at least one memory access pad.

Another aspect of the present disclosure is to provide a chip system operation method used in a chip system that includes the steps outlined below. A processing chip of the chip system is determined to be under an operation mode to perform steps that includes the steps outlined below. A processor of the processing chip is allowed to communicate with an external circuit device by using an I/O controller through at least one I/O pad and at least one I/O pin of the processing chip. The processor is allowed to access the memory chip electrically coupled to at least one memory access pad of the processing chip by using a memory controller of the processing chip through the at least one memory access pad. The processing chip of the chip system is determined to be under a program mode or a test mode to perform steps outlined below. A transmission gate module is enabled to allow the external circuit device to perform programming or testing on the memory chip through the at least one I/O pin, the at least one I/O pad, the transmission gate module and the at least one memory access pad, wherein the transmission gate module is electrically coupled between the at least one I/O pad and the at least one memory access pad.

Yet another aspect of the present disclosure is to provide a processing chip that includes at least one I/O pad, at least one memory access pad, a processor, an I/O controller, a memory controller and a transmission gate module. The I/O pad is electrically coupled to an external circuit device. The memory access pad is electrically coupled to a memory chip. The I/O controller is configured to allow the processor to communicate with the external circuit device by using the I/O controller through the at least one I/O pad and the at least one I/O pin under an operation mode. The memory controller is configured to allow the processor to access the memory chip by using the memory controller through the at least one memory access pad under the operation mode. The transmission gate module is electrically coupled between the at least one I/O pad and the at least one memory access pad and configured to be enabled under a program mode or a test mode to allow the external circuit device to perform programming or testing on the memory chip through the at least one I/O pin, the at least one I/O pad, the transmission gate module and the at least one memory access pad.

These and other features, aspects, and advantages of the present disclosure will become better understood with reference to the following description and appended claims.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
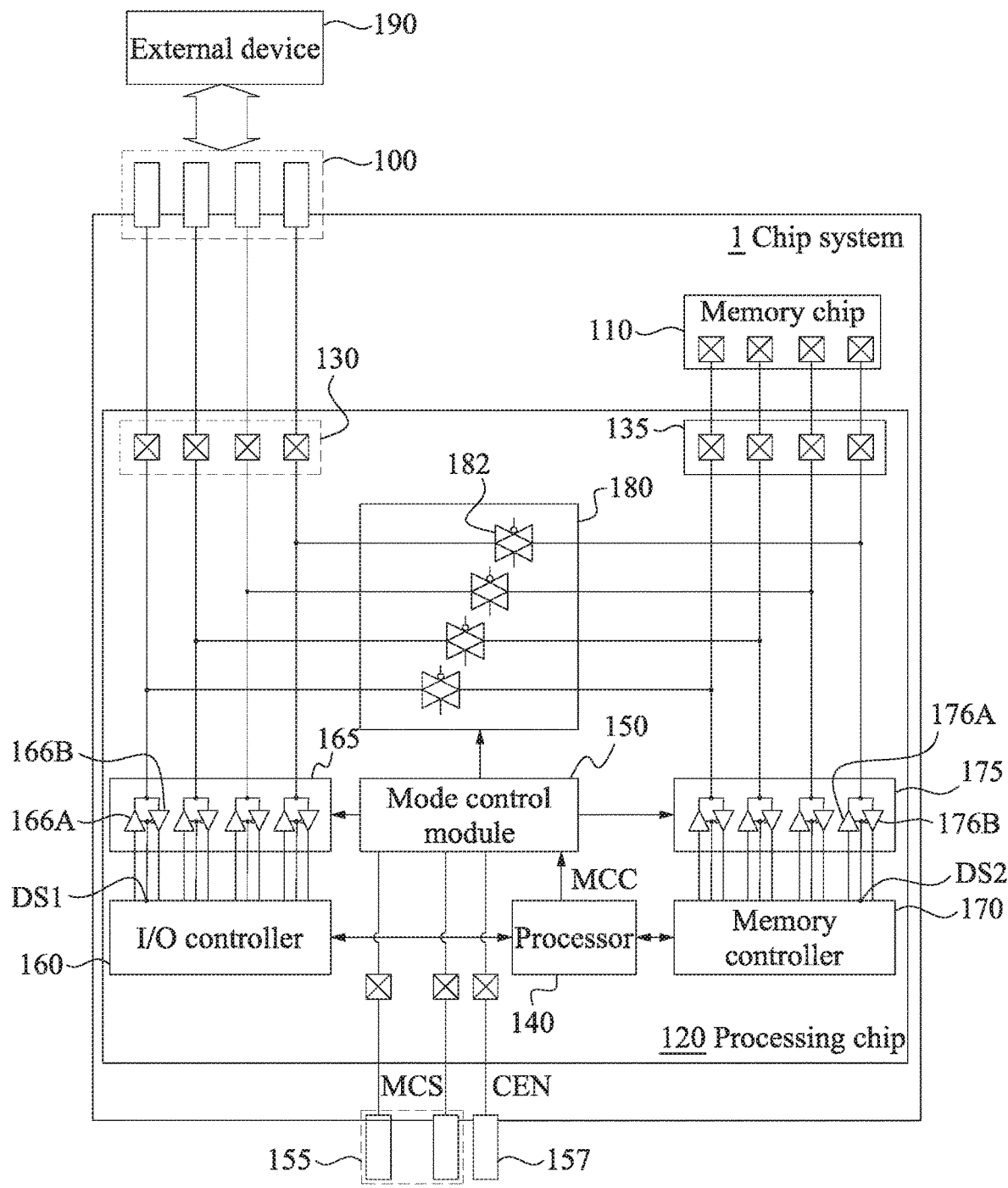
FIG. 1 is a block diagram of a chip system in an embodiment of the present invention.

Reference will now be made in detail to the present embodiments of the disclosure, examples of which are illustrated in the accompanying drawings. Wherever possible, the same reference numbers are used in the drawings and the description to refer to the same or like parts.

Reference is now made to FIG. 1. FIG. 1 is a block diagram of a chip system 1 in an embodiment of the present invention. The chip system 1 includes at least one I/O pin 100, a memory chip 110 and a processing chip 120.

In an embodiment, the memory chip 110 and the processing chip 120 are formed in the same package to form the chip system 1 and can be electrically coupled to an external device 190 through I/O pin 100 to perform communication thereto. According to different application requirements, the external device 190 can be an external circuit device having a specific function, an external program device or an external test device.

In a practical implementation, the package of the chip system 1 may include other chips and other I/O pins and is not limited to the chip and the pins illustrated in FIG. 1. In another embodiment, the memory chip 110 and the processing chip 120 may be disposed in independent packages respectively and may be electrically coupled to each other through access pins.

In an embodiment, the memory chip 110 can be a flash memory. The memory chip 110 is configured to store data such as, but not limited to program code or data of other types such that the processing chip 120 accesses the data to perform operation.

The processing chip 120 includes at least one I/O pad 130, at least one memory access pad 135, a processor 140, a mode control module 150, an I/O controller 160, a first driving module 165, a memory controller 170, a second driving module 175 and a transmission gate module 180.

The I/O pad 130 is electrically coupled to the I/O pin 100. As a result, the processing chip 120 can actually perform communication with the external device 190 through the I/O pad 130 and the I/O pin 100.

The memory access pad 135 is electrically coupled to the memory chip 110. As a result, the processing chip 120 can actually perform operation, e.g. write operation or read operation, on the memory chip 110 through the memory access pad 135.

The processor 140 is configured to perform data access and processing and cooperate with the mode control module 150 to determine and control the modes that the processing chip 120 operates.

In an embodiment, the chip system 1 further include at least one mode control pin 155. The mode control module 150 receives a mode control signal MCS through the mode control pin 155 or receives a mode control command MCC from the processor 140 to determine a mode that the processing chip 120 operates. Further, the first driving module 165, the second driving module 175 and the transmission gate module 180 are controlled according to different modes to form different data and command transmission paths. In an embodiment, the mode control signal MCS can be such as, but not limited to a two-bit signal to select one of the different modes.

The modes that the processing chip 120 operates include such as, but not limited to an operation mode, a program mode and a test mode. The operation of the components of the processing chip 120 under different modes is described in detail in the following paragraphs.

Under the operation mode, the mode control module 150 enables the first driving module 165 and the second driving module 175 and disables the transmission gate module 180.

Under such a condition, the I/O controller 160 is configured to allow the processor 140 to communicate with the external device 190 through the I/O controller 160. More specifically, the I/O controller 160 is actually electrically coupled to the I/O pad 130 through the enabled first driving module 165 such that the processor 140 communicates with the external device 190 by using the I/O controller 160 through the first driving module 165, the I/O pad 130 and the I/O pin 100.

The memory controller 170 is configured to allow the processor 140 to access the memory chip 110 through the memory controller 170. More specifically, the memory controller 170 is actually electrically coupled to the memory access pad 135 through the enabled second driving module 175 such that the processor 140 accesses the memory chip 110 by using the memory controller 170 through the second driving module 175 and the memory access pad 135.

In an embodiment, the first driving module 165 includes at least one pair of tri-state drivers. Taking one pair of tri-state drivers as an example, the pair of tri-state drivers includes a tri-state driver 166A and a tri-state driver 166B and the tri-state drivers operate according to a driving signal DS1 from the I/O controller 160 when the tri-state drivers are enabled.

When the driving signal DS1 is at a first state, the tri-state driver 166A is enabled and the tri-state driver 166B is disabled such that the I/O controller 160 can transmit data or command from the processor 140 to the external device 190 through the first driving module 165. When the driving signal DS1 is at a second state, the tri-state driver 166A is disabled and the tri-state driver 166B is enabled such that the I/O controller 160 can receive data or command from the external device 190 and transmit the data or command to the processor 140.

Similarly, the second driver module 175 includes at least one pair of tri-state drivers. Taking one pair of tri-state drivers as an example, the pair of tri-state drivers includes a tri-state driver 176A and a tri-state driver 176B and the tri-state drivers operate according to a driving signal DS2 from the memory controller 170 when the tri-state drivers are enabled.

When the driving signal DS2 is at a first state, the tri-state driver 176A is enabled and the tri-state driver 176B is disabled such that the memory controller 170 can transmit data or command from the processor 140 to the memory chip 110 through the second driving module 175. When the driving signal DS2 is at a second state, the tri-state driver 176A is disabled and the tri-state driver 176B is enabled such that the memory controller 170 can receive data or command from the memory chip 110 and transmit the data or command to the processor 140.

Further, the transmission gate module 180 is disabled such that the I/O pad 130 and the memory access pad 135 are not electrically coupled.

Under the program mode, the mode control module 150 disables the first driving module 165 and the second driving module 175 and enables the transmission gate module 180.

Since the first driving module 165 and the second driving module 175 are disabled, the processor 140 is not able to communicate with the external device 190 through the I/O controller 160 and is not able to access the memory chip 110 through the memory controller 170.

In an embodiment, under the program mode, the external device 190 can be an external program device and can be electrically coupled to the I/O pad 130 of the processing chip 120 through the I/O pin 100.

Further, the transmission gate module 180 is enabled such that the I/O pad 130 and the memory access pad 135 can be electrically coupled to each other. In an embodiment, the transmission gate module 180 includes a plurality of transmission gates 182 each configured to perform bi-directional communication according to the voltage levels of two terminals thereof. For example, the data and command can be transmitted from the terminal having the higher voltage level to the terminal having the lower voltage level.

As a result, the external program device can perform programming on the memory chip 110 through the I/O pin 100, the I/O pad 130, the transmission gate module 180 and the memory access pad 135 to modify the data content in the memory chip 110. Under such a condition, the external program device can be a general program device instead of a program device having a specific transmission format.

Further, the pins specifically used for programming are not necessarily disposed in the package of the chip system 1. The pins used by the processing chip 120 under the operation mode can be shared in the program mode as well to greatly reduce the disposition cost and the area cost of the pins.

Under the test mode, the mode control module 150 disables the first driving module 165 and enables the second driving module 175 and the transmission gate module 180.

Since the first driving module 165 is disabled, the processor 140 is not able to perform communication with the external device 190 through the I/O controller 160.

Since the second driving module 175 is enabled, the processor 140 can access the memory chip 110 through the memory controller 170 as described in the operation mode.

In an embodiment, under the test mode, the external device 190 can be an external test device to be electrically coupled to the I/O pad 130 of the processing chip 120 through the I/O pin 100.

Furthermore, the transmission gate module 180 is enabled such that the I/O pad 130 and the memory access pad 135 are electrically coupled to each other.

As a result, when the processor 140 accesses the memory chip 110 through the memory controller 170, the external test device can perform test on the memory chip 110 through the I/O pin 100, the I/O pad 130, the transmission gate module 180 and the memory access pad 135. Under such a condition, the external test device can measure the signals of the memory chip 110 transmitted to the memory access pad 135, e.g. the analog waveform of the clock signal, the chip-select signal and the data signal.

Furthermore, the pins specifically used for testing are not necessarily disposed in the package of the chip system 1. The pins used by the processing chip 120 under the operation mode can be shared in the test mode as well to greatly reduce the disposition cost and the area cost of the pins.

It is appreciated that the number of the pad and the pin described above is merely an example. In other embodiments, the chip system 1 and the components therein can have different numbers of pads and pins.

In an embodiment, the chip system 1 further includes a chip enable pin 157. The mode control module 150 is electrically coupled to the chip enable pin 157 to receive a chip enable signal CEN through the chip enable pin 157.

In an embodiment, when the chip enable signal CEN is at a first state, the mode control module 150 allows the processor 140 to be in a power-on state and operate accordingly. When the chip enable signal CEN is at a second state, the mode control module 150 keeps the processor 140 in a power-off state.

According to the combination of the mode control signal MCS and the chip enable signal CEN, the processing chip 120 can be under different modes such that the first driving module 165, the second driving module 175 and the transmission gate module 180 are operated under different modes.

Reference is now made to Table 1. Table 1 is a table illustrating the modes and the operation state of the components corresponding to different commands in an embodiment of the present invention. The symbol 0 in Table 1 represents a low state or a disabled status. The symbol 1 in Table 1 represents a high state or an enabled status. The symbol X represents the status of "don't care". The first driving module 165, the second driving module 175 and the transmission gate module 180 are abbreviated as 1st, 2nd and TG in Table 1.

TABLE 1

| MCS | CEN | Mode | 1st | 2nd | TG |
|-----|-----|------|-----|-----|-----|
| 00 | 1 | Operation | 1 | 1 | 0 |
| 01 | 1 | Program | 0 | 0 | 1 |
| 10 | 1 | Test | 0 | 1 | 1 |
| X | 0 | Power-off | 0 | 0 | 0 |
| X | 0->1 | Power-on | 0 | 0 | 0 |

Figure 2:
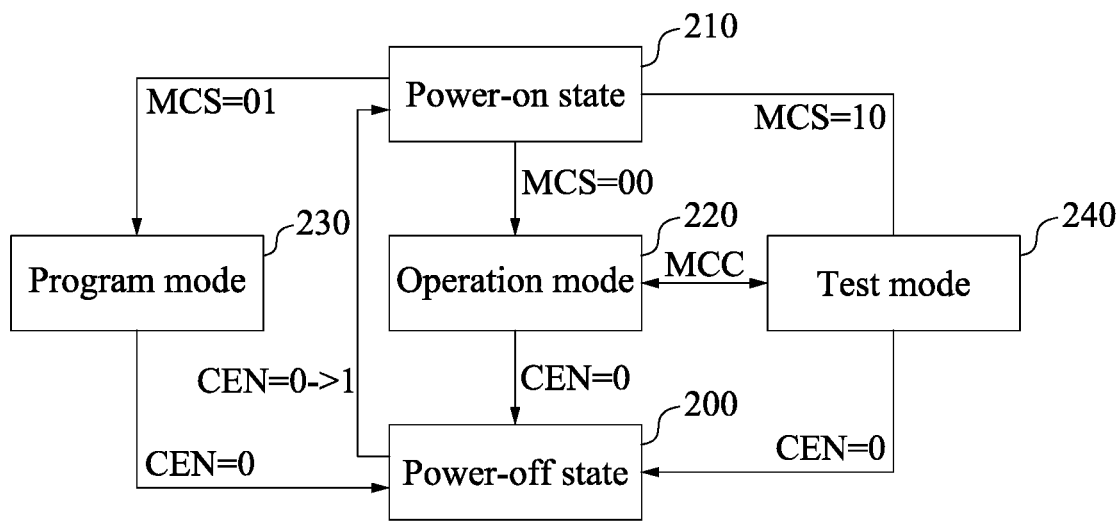
FIG. 2 is a diagram of a finite state machine illustrating the different modes that the processing chip operates in an embodiment of the present invention.

Reference is now made to FIG. 2 at the same time. FIG. 2 is a diagram of a finite state machine illustrating the different modes that the processing chip 120 operates in an embodiment of the present invention.

As illustrated in Table 1, when the chip enable signal CEN is 0, the processing chip 120 is at the power-off state 200. Under such a condition, the high state or the low state of the mode control signal MCS does not affect the mode that the processing chip 120 operates. The first driving module 165, the second driving module 175 and the transmission gate module 180 are disabled.

When the chip enable signal CEN turns from 0 to 1, the processing chip 120 enters the power-on state 210. The mode control module 150 generates such as, but not limited to a power-on reset signal. Under such a condition, the processing chip 120 performs initialization process such that the high state or the low state of the mode control signal MCS does not affect the mode that the processing chip 120 operates. The first driving module 165, the second driving module 175 and the transmission gate module 180 are disabled.

After the processing chip 120 enters the power-on state 210, the mode control module 150 detects the state of the mode control signal MCS received by the mode control pin 155 to determine the mode that the processing chip 120 operates subsequently and write the state of the mode control signal MCS to a related register (not illustrated). In an embodiment, after the detection, the mode control pin 155 used to receive the mode control signal MCS can be used to perform other functions. However, the present invention is not limited thereto.

When the mode control signal MCS is 00, the mode control module 150 makes the processing chip 120 enters operation mode 220 to enable the first driving module 165 and the second driving module 175 and disable the transmission gate module 180. When the mode control signal MCS is 01, the mode control module 150 makes the processing chip 120 enter the program mode 230 to disable the first driving module 165 and the second driving module 175 and enable the transmission gate module 180. When the mode control signal MCS is 10, the mode control module 150 makes the processing chip 120 enter the test mode 240 to disable the first driving module 165 and enable the second driving module 175 and the transmission gate module 180.

After entering any one of the three modes describe above, the processor 140 can control the mode control module 150 by using the mode control command MCC such that the processing chip 120 enters other modes. For example, the processor 140 can control the mode control module 150 by using the mode control command MCC such that the processing chip 120 switches from operation mode 220 to the test mode 240 or from the test mode 240 to the operation mode 220.

As a result, the chip system 1 of the present invention allows the program path and test path of the memory chip 110 and the data transmission path of the I/O controller 160 under the operation mode to share the I/O pin 100 and the I/O pad 130. The pins and pads specifically for programming and testing of the memory chip 110 are not necessarily disposed such that the disposition cost can be reduced. Further, a generic program device can be used to program the memory chip 110 and a test device can be used to measure actual analog waveforms of the signals of the memory chip 110.

Figure 3:
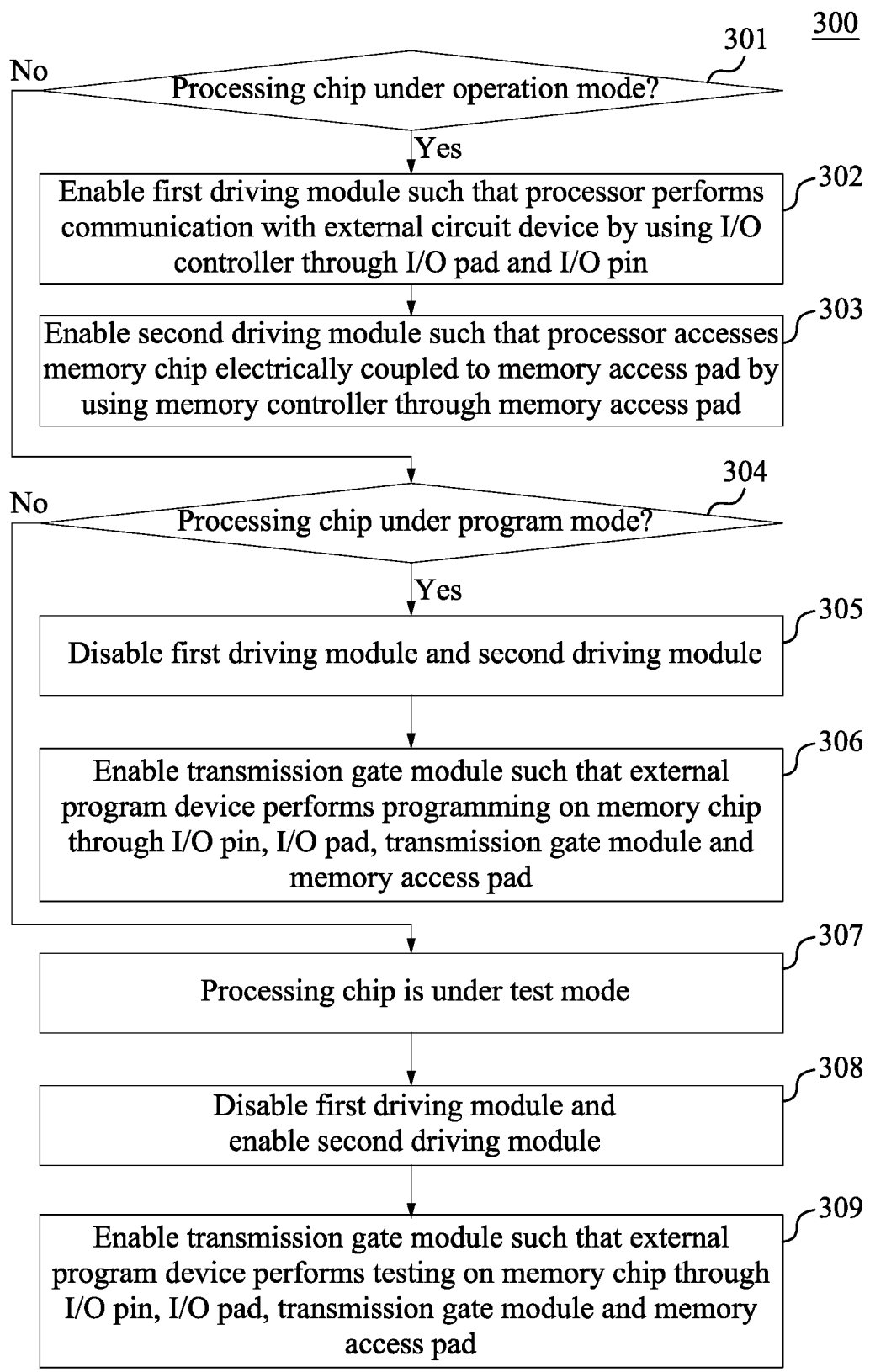
FIG. 3 is a flow chart of a chip system operation method in an embodiment of the present invention.

Reference is now made to FIG. 3. FIG. 3 is a flow chart of a chip system operation method 300 in an embodiment of the present invention. The chip system operation method 300 can be used in the chip system 1 illustrated in FIG. 1. The chip system operation method 300 includes the steps outlined below. The steps are not recited in the sequence in which the operations are performed. That is, unless the sequence of the operations is expressly indicated, the sequence of the steps is interchangeable, and all or part of the steps may be simultaneously, partially simultaneously, or sequentially performed.

In step 301, whether the processing chip 120 is under the operation mode is determined.

When the processing chip 120 is under the operation mode, in step 302, the first driving module 165 is enabled such that the processor 140 of the processing chip 120 performs communication with the external circuit device 190 by using the I/O controller 160 through the I/O pad 130 and the I/O pin 100 electrically coupled to the I/O pad 130.

Further, in step 303, the second driving module 175 is enabled such that the processor 140 accesses the memory chip 110 electrically coupled to the memory access pad 135 by using the memory controller 170 in the processing chip 120 through the memory access pad 135.

When the processing chip 120 is determined to be not under the operation mode, in step 304, whether the processing chip 120 is under the program mode is determined.

When the processing chip 120 is under the program mode, in step 305, the first driving module 165 and the second driving module 175 are disabled.

Further, in step 306, the transmission gate module 180 of the processing chip 120 is enabled such that the external program device performs programming on the memory chip 110 through the I/O pin 100, the I/O pad 130, the transmission gate module 180 and the memory access pad 135.

When the processing chip 120 is determined to be not under the program mode in step 304, in step 307, the processing chip 120 is determined to be under the test mode.

In step 308, the first driving module 165 is disabled and the second driving module 175 is enabled.

Further, in step 309, the transmission gate module 180 of the processing chip 120 is enabled such that the external test device performs testing on the memory chip 110 through the I/O pin 100, the I/O pad 130, the transmission gate module 180 and the memory access pad 135.

It is appreciated that each of the modules in the processing chip and the chip system or the steps of the chip system operation method described above can be implemented by either hardware, software or firmware according to designer's requirements.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A chip system, comprising:
at least one I/O pin;
a memory chip; and
a processing chip comprising:
    at least one I/O pad electrically coupled to the at least one I/O pin;
    at least one memory access pad electrically coupled to the memory chip;
    a processor;
    an I/O controller configured to allow the processor to communicate with an external circuit device by using the I/O controller through the at least one I/O pad and the at least one I/O pin under an operation mode;
    a memory controller configured to allow the processor to access the memory chip by using the memory controller through the at least one memory access pad under the operation mode; and
    a transmission gate module electrically coupled between the at least one I/O pad and the at least one memory access pad and configured to be enabled under a program mode or a test mode to allow the external circuit device to perform programming or testing on the memory chip through the at least one I/O pin, the at least one I/O pad, the transmission gate module and the at least one memory access pad,
    wherein under the test mode, the processor accesses the memory chip through the memory controller and the processor does not communicate with the external circuit device through the I/O controller.

2. The chip system of claim 1, wherein the processing chip further comprises:
a first driving module electrically coupled between the I/O controller and the at least one I/O pad and configured to be enabled to allow the I/O controller to communicate with the external circuit device through the first driving module and the at least one I/O pad; and
a second driving module electrically coupled between the memory controller and the at least one memory access pad and configured to be enabled to allow the memory controller to access the memory chip through the second driving module and the at least one memory access pad.

3. The chip system of claim 2, wherein the processing chip further comprises a mode control module configured to enable the first driving module and the second driving module under the operation mode and disable the first driving module and the second driving module under the program mode.

4. The chip system of claim 3, wherein the mode control module is further configured to disable the first driving module and enable the second driving module under the test mode such that when the processor accesses the memory through the second driving module and the at least one memory access pad, the external circuit device performs testing on the memory chip through the at least one I/O pad, the transmission gate module and the at least one memory access pad.

5. The chip system of claim 3, wherein the mode control module receives a mode control signal through at least one mode control pin or receives a mode control command from the processor to determine a mode that the processing chip operates.

6. The chip system of claim 3, wherein the mode control module receives a chip enable signal through a chip enable pin to determine whether the processing chip operates under a power-on state or a power-off state according to the chip enable signal.

7. A chip system operation method used in a chip system, comprising:
   determining a processing chip of the chip system is under an operation mode to perform steps of:
      allowing a processor of the processing chip to communicate with an external circuit device by using an I/O controller through at least one I/O pad and at least one I/O pin of the processing chip; and
      allowing the processor to access a memory chip electrically coupled to at least one memory access pad of the processing chip by using a memory controller of the processing chip through the at least one memory access pad; and
   determining the processing chip of the chip system is under a program mode or a test mode to perform steps of:
      enabling a transmission gate module to allow the external circuit device to perform programming or testing on the memory chip through the at least one I/O pin, the at least one I/O pad, the transmission gate module and the at least one memory access pad, wherein the transmission gate module is electrically coupled between the at least one I/O pad and the at least one memory access pad,
   wherein when the external circuit device performs the test mode for testing on the memory chip, the processor accesses the memory chip through the memory controller and the processor does not communicate with the external circuit device through the I/O controller.

8. The chip system operation method of claim 7, further comprising:
   enabling a first driving module electrically coupled between the I/O controller and the at least one I/O pad to allow the I/O controller to communicate with the external circuit device through the first driving module and the at least one I/O pad; and
   enabling a second driving module electrically coupled between the memory controller and the at least one memory access pad to allow the memory controller to access the memory chip through the second driving module and the at least one memory access pad.

9. The chip system operation method of claim 8, further comprising:
   enabling the first driving module and the second driving module by a mode control module comprised in the processing chip under the operation mode; and
   disabling the first driving module and the second driving module by the mode control module under the program mode.

10. The chip system operation method of claim 9, further comprising:
   disabling the first driving module and enabling the second driving module by the mode control module under the test mode such that when the processor accesses the memory through the second driving module and the at least one memory access pad; and
   testing the memory chip by the external circuit device through the at least one I/O pad, the transmission gate module and the at least one memory access pad.

11. The chip system operation method of claim 9, further comprising:
   receiving a mode control signal by the mode control module through at least one mode control pin or receiving a mode control command from the processor to determine a mode that the processing chip operates.

12. The chip system operation method of claim 9, further comprising:
   receiving a chip enable signal by the mode control module through a chip enable pin to determine whether the processing chip operates under a power-on state or a power-off state according to the chip enable signal.

13. A processing chip, comprising:
   at least one I/O pad electrically coupled to an external circuit device;
   at least one memory access pad electrically coupled to a memory chip;
   a processor;
   an I/O controller configured to allow the processor to communicate with the external circuit device by using the I/O controller through the at least one I/O pad and the at least one I/O pin under an operation mode;
   a memory controller configured to allow the processor to access the memory chip by using the memory controller through the at least one memory access pad under the operation mode; and
   a transmission gate module electrically coupled between the at least one I/O pad and the at least one memory access pad and configured to be enabled under a program mode or a test mode to allow the external circuit device to perform programming or testing on the memory chip through the at least one I/O pin, the at least one I/O pad, the transmission gate module and the at least one memory access pad,
   wherein under the test mode, the processor accesses the memory chip through the memory controller and the processor does not communicate with the external circuit device through the I/O controller.

14. The processing chip of claim 13, wherein the processing chip further comprises:
   a first driving module electrically coupled between the I/O controller and the at least one I/O pad and configured to be enabled to allow the I/O controller to communicate with the external circuit device through the first driving module and the at least one I/O pad; and
   a second driving module electrically coupled between the memory controller and the at least one memory access pad and configured to be enabled to allow the memory controller to access the memory chip through the second driving module and the at least one memory access pad.

15. The processing chip of claim 14, wherein the processing chip further comprises a mode control module configured to enable the first driving module and the second driving module under the operation mode and disable the first driving module and the second driving module under the program mode.

16. The processing chip of claim 15, wherein the mode control module is further configured to disable the first driving module and enable the second driving module under the test mode such that when the processor accesses the memory through the second driving module and the at least one memory access pad, the external circuit device performs testing on the memory chip through the at least one I/O pad, the transmission gate module and the at least one memory access pad.

17. The processing chip of claim 15, wherein the mode control module receives a mode control signal through at least one mode control pin or receives a mode control command from the processor to determine a mode that the processing chip operates.

18. The processing chip of claim 15, wherein the mode control module receives a chip enable signal through a chip enable pin to determine whether the processing chip operates under a power-on state or a power-off state according to the chip enable signal.

19. The processing chip of claim 15, wherein the memory chip is a flash memory.

20. The processing chip of claim 13, wherein the external circuit device performs an analog waveform measurement on the memory chip.

\* \* \* \* \*